(12) United States Patent
Vitkuté

(10) Patent No.: US 10,829,291 B2
(45) Date of Patent: Nov. 10, 2020

(54) METHOD TO PREVENT SILICA-BASED COLUMN AGING

(71) Applicant: Thermo Fisher Scientific Baltics UAB, Vilnius (LT)

(72) Inventor: Jolanta Vitkuté, Vilnius (LT)

(73) Assignee: Thermo Fischer Scientific Baltics UAB, Vilnius (LT)

(*) Notice: Subject to any disclaimer, the term of this patent is extended or adjusted under 35 U.S.C. 154(b) by 879 days.

(21) Appl. No.: 13/906,243

(22) Filed: May 30, 2013

(65) Prior Publication Data
US 2013/0341213 A1 Dec. 26, 2013

Related U.S. Application Data

(60) Provisional application No. 61/662,021, filed on Jun. 20, 2012.

(51) Int. Cl.
| | | |
|---|---|---|
| *B65D 81/24* | (2006.01) | |
| *B01D 15/20* | (2006.01) | |
| *G01N 30/60* | (2006.01) | |
| *B01J 20/283* | (2006.01) | |

(52) U.S. Cl.
CPC .......... *B65D 81/24* (2013.01); *B01D 15/203* (2013.01); *B01J 20/283* (2013.01); *G01N 30/60* (2013.01); *B01J 2220/58* (2013.01)

(58) Field of Classification Search
CPC ....... B65D 81/24; B01D 15/203; B01J 20/283
See application file for complete search history.

(56) References Cited

U.S. PATENT DOCUMENTS

| | | | | |
|---|---|---|---|---|
| 5,135,715 | A * | 8/1992 | Andersen | A61L 2/206 239/56 |
| 5,147,921 | A | 9/1992 | Mallo | |
| 5,763,028 | A * | 6/1998 | Matsumoto | A61L 2/04 206/484.2 |
| 5,936,178 | A | 8/1999 | Saari | |
| 5,938,012 | A * | 8/1999 | Yeager | A24F 25/02 206/205 |
| 6,124,391 | A | 9/2000 | Sun et al. | |
| 6,244,432 | B1 | 6/2001 | Saari et al. | |
| 6,782,675 | B1 * | 8/2004 | Banks | B65B 55/22 206/204 |
| 6,921,026 | B2 | 7/2005 | Saari et al. | |
| 8,216,512 | B2 * | 7/2012 | Winther | G01N 1/30 422/67 |
| 2003/0203081 | A1 * | 10/2003 | Saari | A23L 3/3418 426/133 |

(Continued)

FOREIGN PATENT DOCUMENTS

| | | |
|---|---|---|
| EP | 1105168 B1 | 7/2002 |
| WO | 2010/136371 A1 | 12/2010 |
| WO | 2010/136372 A2 | 12/2010 |
| WO | 2011/076386 A1 | 6/2011 |

OTHER PUBLICATIONS

Extended European Search Report, EP13172898.2, dated Sep. 23, 2013 (8 pages).
Haghedooren et al. Effect of long-term storage and use on the properties of reversed-phase liquid chromatographic columns. Talanta, vol. 76, No. 1 (2008), pp. 172-182.

(Continued)

*Primary Examiner* — Steven A. Reynolds
*Assistant Examiner* — Javier A Pagan

(57) ABSTRACT

Methods and kits using a humidifying agent to prevent or reduce aging of a silica-based columns. A beneficial result of the method is associated robustness of column nucleic acid binding capacity, compared to an aged column.

16 Claims, 5 Drawing Sheets

(56) References Cited

U.S. PATENT DOCUMENTS

| | | | |
|---|---|---|---|
| 2004/0224144 A1 | 11/2004 | Saari et al. | |
| 2005/0196586 A1* | 9/2005 | Shimodaira | B01D 39/20 |
| | | | 428/116 |
| 2006/0003121 A1* | 1/2006 | Scheller | B65D 33/2591 |
| | | | 428/35.7 |
| 2006/0094015 A1* | 5/2006 | Smith | C12N 15/1006 |
| | | | 435/6.11 |
| 2007/0161004 A1* | 7/2007 | Brown | C12N 15/111 |
| | | | 435/6.14 |
| 2008/0047702 A1* | 2/2008 | Neff | A24F 25/02 |
| | | | 165/222 |
| 2008/0314772 A1 | 12/2008 | Saari et al. | |
| 2011/0027862 A1* | 2/2011 | Bates | C12N 15/1003 |
| | | | 435/235.1 |
| 2013/0289265 A1* | 10/2013 | Li | B01J 20/24 |
| | | | 536/25.42 |

OTHER PUBLICATIONS

Link and Keller. Effects of Solutions Used for Storage of Size-Exclusion Columns on Subsequent Chromatography of Peptides and Proteins. Elsevier Science Publishers B.V. (1985), 12 pages.

Boom et al. Rapid and simple method for purification of nucleic acids. J Clin Microbiol. vol. 28, No. 3 (1990), pp. 495-503.

Herzer. (2002) DNA Purification, in Molecular Biology Problem Solver: A Laboratory Guide (Ed A. S. Gerstein), John Wiley & Sons, Inc., New York USA. Chapter 7, pp. 167-195.

Xu et al. Altered nucleic acid partitioning during phenol extraction or silica adsorption by guanidinium and potassium salts. Anal Biochem. vol. 419, No. 2 (2011), pp. 309-316.

* cited by examiner

METHOD TO PREVENT SILICA-BASED COLUMN AGING

This application claims priority from U.S. Application Ser. No. 61/662,021 filed Jun. 20, 2012 which is expressly incorporated by reference herein in its entirety.

Nucleic acid purification methods based on the use of silica compounds represent the major share of commercial nucleic acid (NA) purification kit markets. The term silica is used herein to mean the glass fiber filter material used as nucleic acid binding means, often in the form of columns, such as spin columns. In silica columns-based nucleic acid purification systems, nucleic acids are first released from biosamples, e.g., by disruption with chaotropic lysis buffer, followed by nucleic acid binding to the silica filter material in the presence of high concentration of chaotropic salts and ethanol or isopropanol (Boom et al. 1990). Salts and other contaminants are removed from the silica filter material-bound nucleic acid by subsequent washes of the column, e.g., with ethanol. The purified nucleic acid is then eluted from the silica filter material by low ionic solutions (Herzer 2002). The main drawback and general weakness of silica-based NA purification columns is acknowledged to be the column-to-column inconsistency of the isolated nucleic acids yield.

In technical literature, silica filters are described as materials of constant weight, made of 100% borosilicate glass fibers, not influenced by any variations in atmospheric humidity. However, commercial silica-based columns have limited and comparatively short shelf-life. For example, manufacturers indicate that the shelf life of most commercial kits with silica based columns is usually one year at room temperature. Users have observed inconsistency in column performance. There is no public information available from silica columns NA purification kit suppliers that would reveal or explain the inconsistent column NA yield, although column aging is recognized as a problem by majority of industrial silica columns suppliers.

It is known that aging of silica-based columns, i.e. decrease in binding capacity of nucleic acids during prolonged storage, is especially visible when silica-based columns are stored at room temperature or higher temperatures. Although this problem can be addressed by storing silica-based columns at 2° C. to 8° C., such storage conditions are considered as not desirable and are classified as a disadvantage, especially if the product is procured in bulk amounts.

Despite the high stability of glass fibers, glass fiber qualities do change with time mainly because the glass fiber material dries out. However, this process is reversible: when the filter is pre-wetted, its binding capacity is restored. One manufacturer sells nucleic acid purification kits that contain a column preparation solution (Sigma-Aldrich "GenElute Mammalian Genomic DNA Miniprep Kit", online catalog). According to manufacturer recommendations, columns are pretreated with Column Preparation Solution before nucleic acid purification. Product literature states that the Column Preparation Solution maximizes DNA binding to the silica filter, thereby resulting in more consistent yields.

Another manufacturer of silica-based columns suggests solving the same column aging/membrane protection problem by column wetting with aqueous solution containing nucleophilic compounds such as alcohol, sorbitol, xylitol, or lactitol as described in WO 2010/136371, or by reactivation of silica surface with water or aqueous solution as described in WO 2010/136372A1, each of which is expressly incorporated by reference herein in its entirety. Although such column pretreatment restores column quality, it adds extra steps and increases the length of the purification process. These methods are disadvantageous and undesirable for the user.

There is an industry need for improved column aging prevention methods that do not require additional user manipulations, do not require extra steps and extra time, and do not require special product storage conditions such as storage at 2° C. to 8° C.

One embodiment is a method to prevent or reduce aging of a silica-based column by storing the silica-based column in a hermetic storage environment in the presence of at least one humidifying agent to result in reduced silica-based column aging. The method desirably results in enhanced nucleic acid binding capacity of the silica-based column.

One embodiment is a method to enhance nucleic acid binding capacity of a silica-based column by storing the silica-based column in a hermetic storage environment in the presence of at least one humidifying agent to result in reduced silica-based column aging.

In either embodiment, the humidifying agent results in a relative humidity in the range of 40% to 70% in the hermetic storage environment. It may be STOCKOSORB® polyacrylic acid-potassium salt, crosslinked (600 series); or crosslinked acrylamide/acrylic acid copolymer and potassium salt (500 series)), Cigar Mechanic, and/or HUMIDIPAK® (water, sodium chloride, potassium chloride, xanathan gum, and/or propylene glycol alginate and/or Gellan). The HUMIDIPAK® humidifying agent may be BOVEDA 72% (water, sodium chloride, potassium chloride, xanathan gum, and/or propylene glycol alginate and/or Gellan). The hermetic storage environment may be a plastic bag. The silica-based column may be a gravity-flow column, a vacuum-assisted flow column, or a spin column.

One embodiment is a kit 5 for a silica-based column 10 that contains at least one humidifying agent 15, a container 20 for providing a hermetic storage environment 25, and instructions 30 for storing the column using the kit 5 as shown in FIG. 5A.

One embodiment is a package 35 for a silica-based column 10. The package 35 contains a hermitic storage environment 25 containing at least one humidifying agent 15, and may contain a silica-based column 10. The humidifying agent 15 can be incorporated within the hermetic storage environment 25 as shown in FIG. 5B.

The inventive method and kits incorporate certain materials that are used as synthetic humidifiers for storage of, e.g., luxury products such as cigars or drugs, or as soil humidity stabilizers in agronomy (e.g., STOCKOSORB® (polyacrylic acid-potassium salt, crosslinked (600 series) or crosslinked acrylamide/acrylic acid copolymer and potassium salt (500 series)), HUMIDIPAK® (water, sodium chloride, potassium chloride, xanathan gum, and/or propylene glycol alginate and/or Gellan)). These materials protected silica-based columns from aging when added to a column storage environment, e.g. column storage material and/or column package material that is substantially impervious to air and/or water and/or water vapor, i.e., hermetic containers or packaging material (e.g., bags). The inventive method solved the column aging problem, not by restoring lost column binding capacity, but instead by preventing its decrease in time by protecting glass fiber filters from desiccation. The stored silica-based product displayed consistent performance without the need for any additional user manipulations, and it exhibited prolonged shelf life.

The exact mechanism of nucleic acid absorption onto glass fiber filters, and the role of water molecules in this process, remains unclear (Herzer 2002; Xu et al. 2011).

Without being held to a single theory, it is possible that chaotropic salts disrupt water structure, allowing positively charged ions to form a salt bridge between the negatively charged silica and the negatively charged nucleic acids backbone under high salt conditions. The strength of nucleic acids binding depends on the cation group used to shield negative charges of the phosphate backbone of the nucleic acid and the pH. The amount of residual water in glass fiber filter depends on relative humidity of its storage environment.

In attempting to explain why glass fibers change binding capacity during filter drying, by analogy, one could resort to so-called effect of the wet sponge: a wet sponge is often more effective at absorption of water than a dry one. Similar to a sponge, the glass fiber filter contains many pores. When the sponge/filter is dry, a relatively large volume of water passes as flow-through these holes/pores without even wetting the sponge. As the sponge/filter becomes wet, it swells from the large volume of water it has taken in, and majority of internal holes/pores become filled. New water molecules can enter the sponge only by substituting water that is already absorbed. As a result, not as much water, or binding solution containing nucleic acids with a column, can freely flow through the filter without interacting with the silica layer that causes nucleic acid to bind onto silica. Another potential explanation could be found in the properties of water as a chemical compound. Water molecules are highly attracted to one another. This means that if a sponge is already wet, the water in the sponge will hold onto the water being poured into it, so the sponge/filter absorbs more water/binding mixture with nucleic acids.

The inventive method and kit seek to maintain columns with glass fiber material in the optimal relative humidity environment. This is akin to the wet sponge described above, which results in the increased ability to bind water/lysed sample with nucleic acids. This is advantageous for the user because it eliminates the need for an additional column pre-wetting phase before purification. In addition, the inventive method decreases column to column variability.

BRIEF DESCRIPTION OF THE DRAWINGS

In one embodiment, columns with different types of glass fiber filters were stored for different periods at room temperature at relative humidity 20-25%, and then placed into hermetic bags with three different humidifiers: Cigar Mechanic, STOCKOSORB®, or BOVEDA 72%, and stored for different times at room temperature. As shown in FIG. 1, 30 µg lambda DNA was purified using GeneJET™ Genomic DNA Purification Kit (Thermo Scientific) with naturally dried silica-based mini columns stored in an environment without synthetic humidifiers or with different synthetic humidifiers. Two different manufacturing lots of columns were stored for 16 months (lot No. 1) and 5 months (lot No. 2) at room temperature at a relative humidity of 20-25%, after which columns were placed into hermetic bags with three different humidifiers: Cigar Mechanic, STOCKOSORB® and BOVEDA 72%, and stored for eight days at room temperature (RT). Yields of purified lambda DNA shown in FIG. 1 were quantified spectrophotometrically.

In one embodiment, freshly manufactured columns, i.e., immediately after insertion of the silica filter into a precast plastic column, were artificially desiccated at 37° C. or at 50° C. for one weeks or a few weeks to simulate natural drying processes occurring at room temperatures during prolonged storage of up to one year. Relative humidity in hermetic packs was measured using a Velleman WS8461 humidity measuring instrument. DNA yields (phage lambda, genomic, plasmid) obtained after purification with columns stored in an environment of different relative humidity were measured spectrophotometrically.

Figure 2:
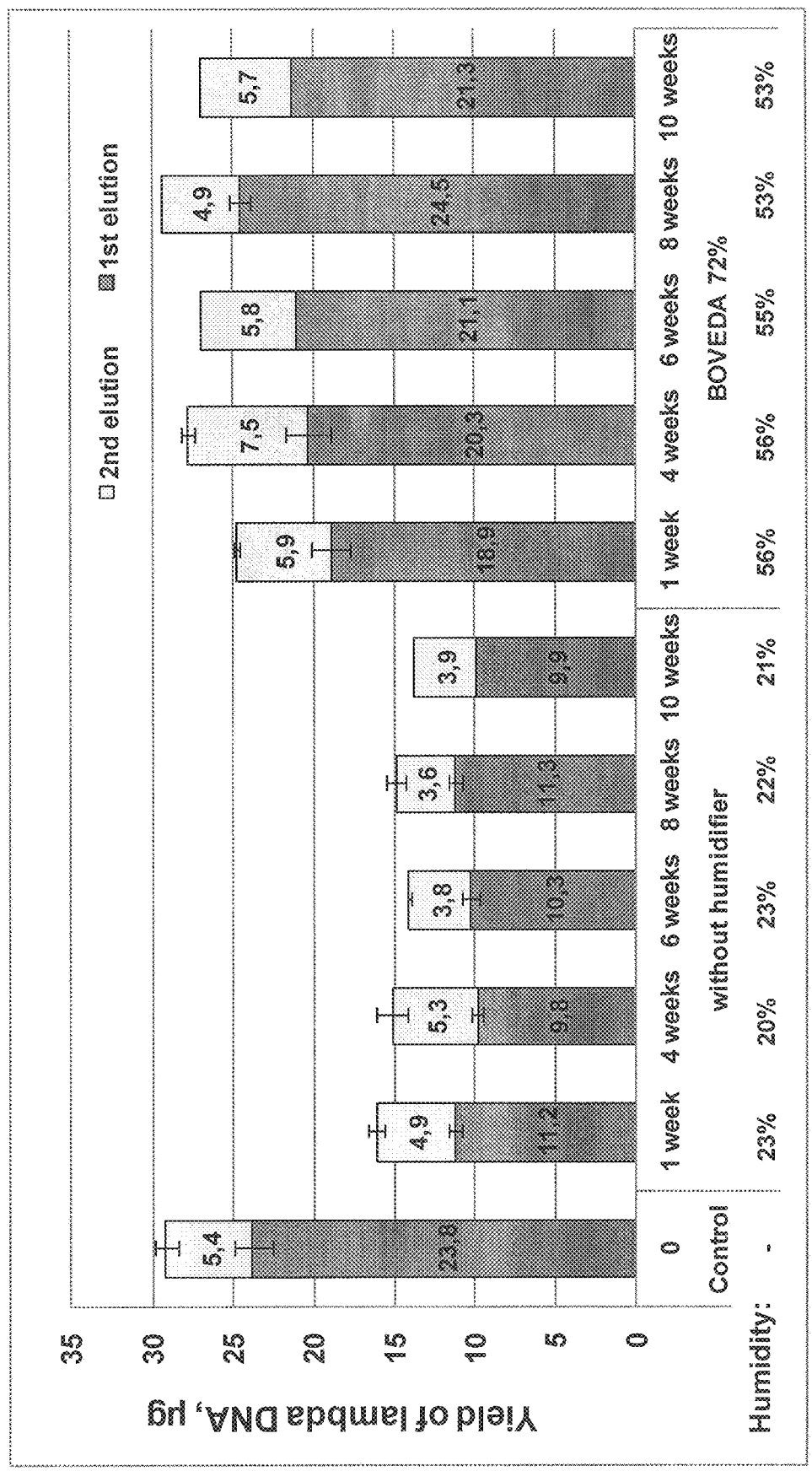
FIG. 2 shows restoration and maintenance of binding capacity of mini silica-based spin columns by adding synthetic humidifier BOVEDA72% (water, sodium chloride, potassium chloride, xanathan gum, and/or propylene glycol alginate and/or Gellan) to the storage environment.

As shown in FIG. 2, 30 µg lambda DNA was purified using GeneJET™ Genomic DNA Purification Kit (Thermo Scientific) with artificially dried-out silica-based mini columns stored in an environment without or with synthetic humidifier (HUMIDIPAK® BOVEDA 72%). All silica-based columns were artificially desiccated at 37° C. for one week except the control column, which was not dried. Columns were then placed into hermetic bags without a synthetic humidifier or with synthetic humidifier BOVEDA 72% and stored for one week to ten weeks at room temperature. Yields of purified lambda DNA shown in FIG. 2 were quantified spectrophotometrically.

Figure 3:
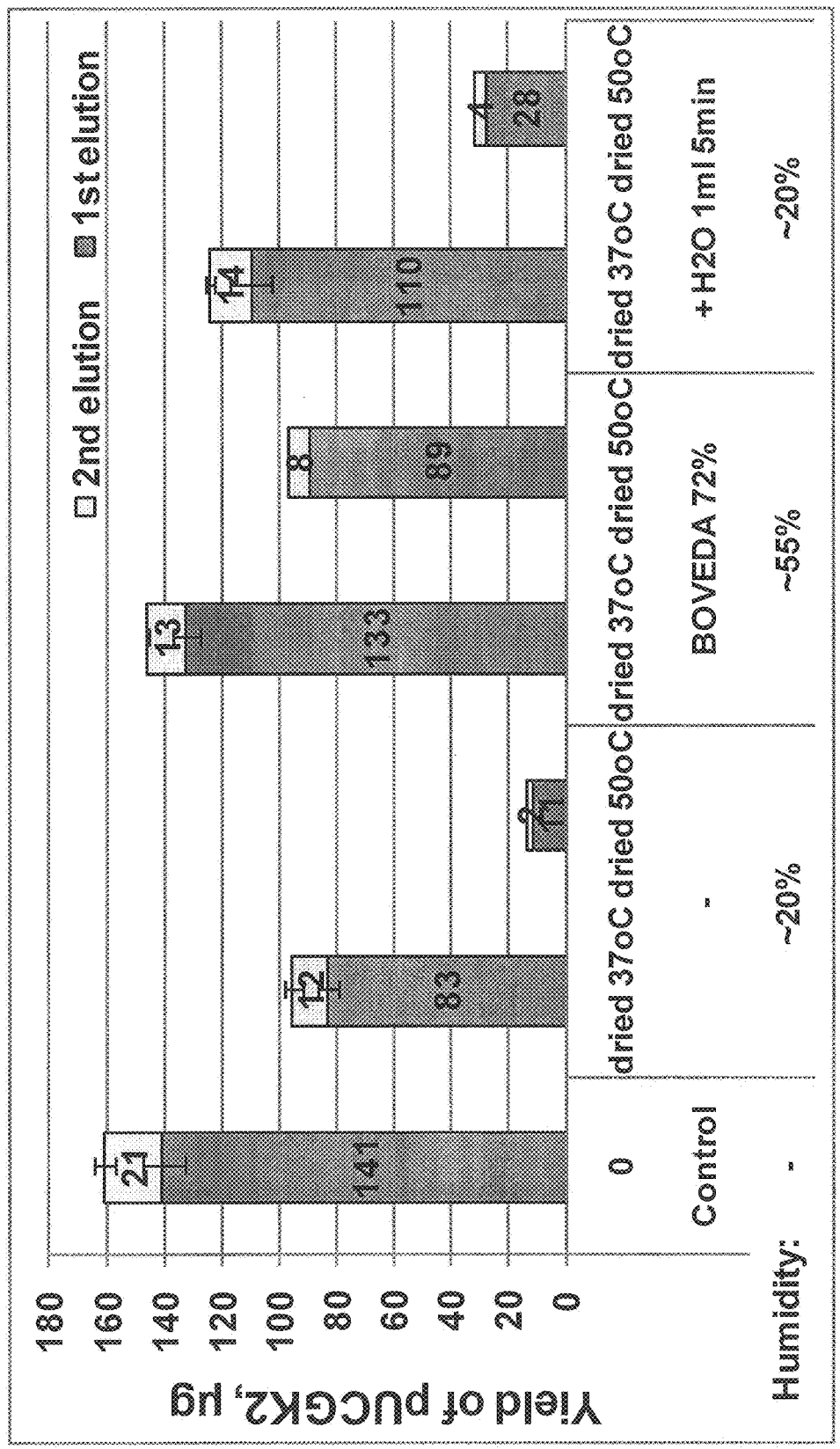
FIG. 3 shows restoration of performance of desiccated based columns by use of humidifier BOVEDA 72%, and its comparison with water pre-wetted columns which were pre-wetted directly before purification.

In one embodiment, humidified silica-based columns were compared to columns that had been pre-wetted directly before use. As shown in FIG. 3, 200 µg plasmid DNA pUCGK2 was purified using GeneJET™ Plasmid Midiprep Kit (Thermo Scientific). All silica based columns were artificially desiccated at 37° C. or 50° C. for 2.5 months except a control column that was not dried. Columns were then placed into hermetic bags with or without synthetic humidifier HUMIDIPAK® BOVEDA 72% and stored for six weeks at room temperature. For comparisons, 1000 µl water was added directly before purification to the center of the silica-based filter of the column stored without humidifier and incubated for five min at room temperature, and afterward the column was centrifuged for one minute at 8000×g. Yields of purified pUCGK2 DNA shown in FIG. 3 were quantified spectrophotometrically.

Figure 4:
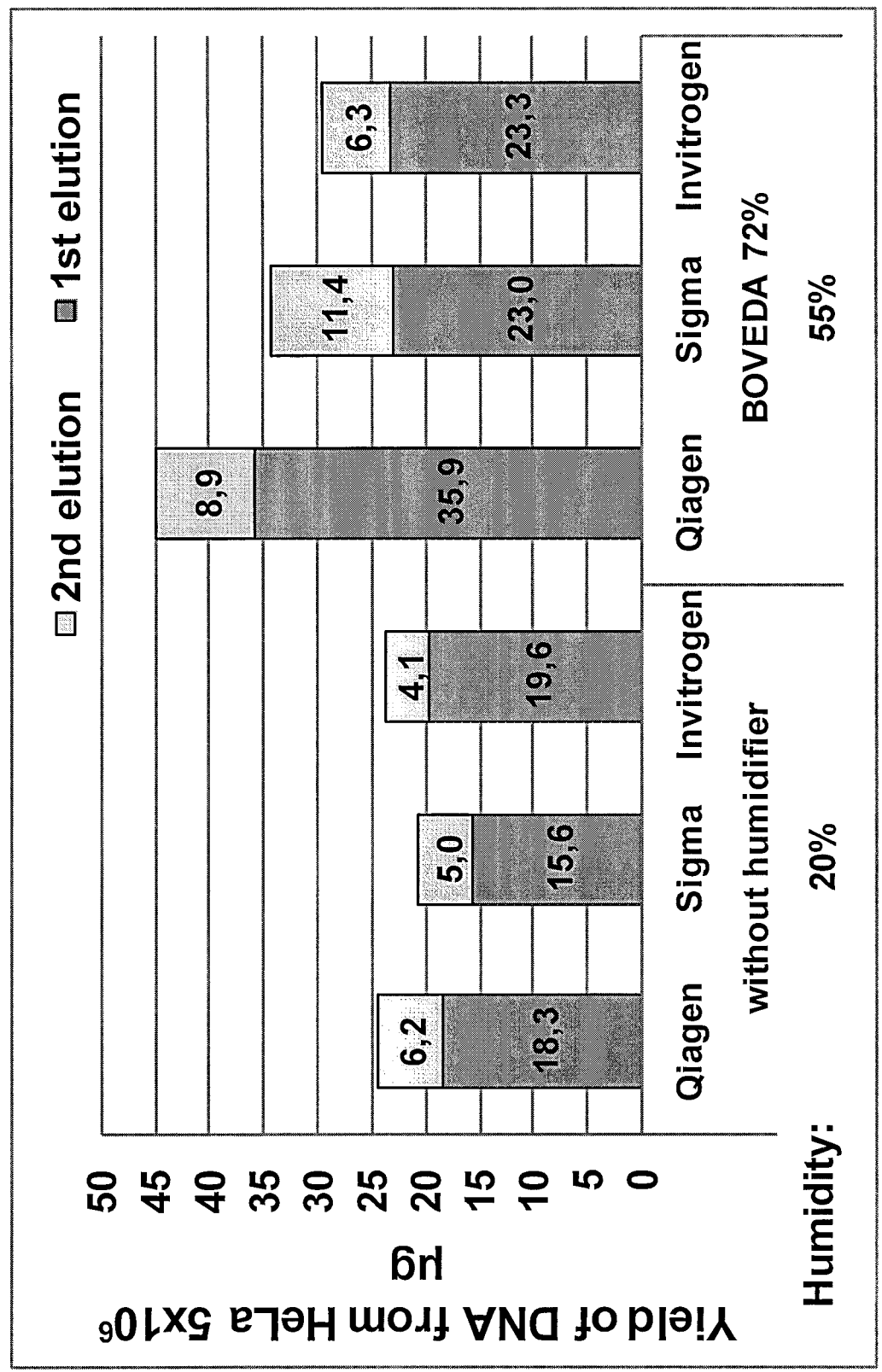
FIG. 4 shows increase in binding capacity of silica-based columns obtained from three different manufacturers by adding synthetic humidifier BOVEDA 72% to the column storage environment.
Figure 5A:
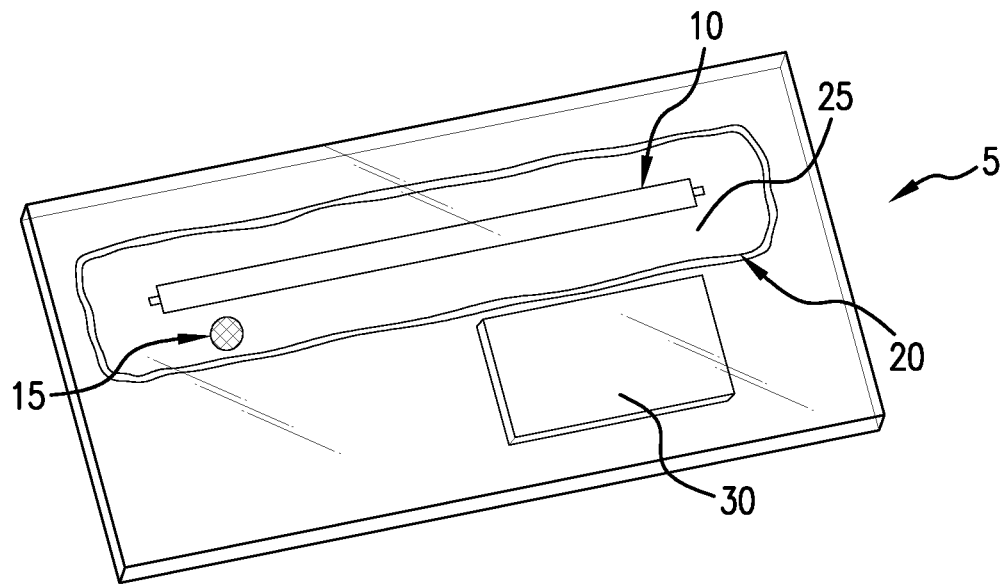
FIG. 5A shows a kit with instructions, a column, a container for providing a hermetic storage environment, and a humidifying agent.
Figure 5B:
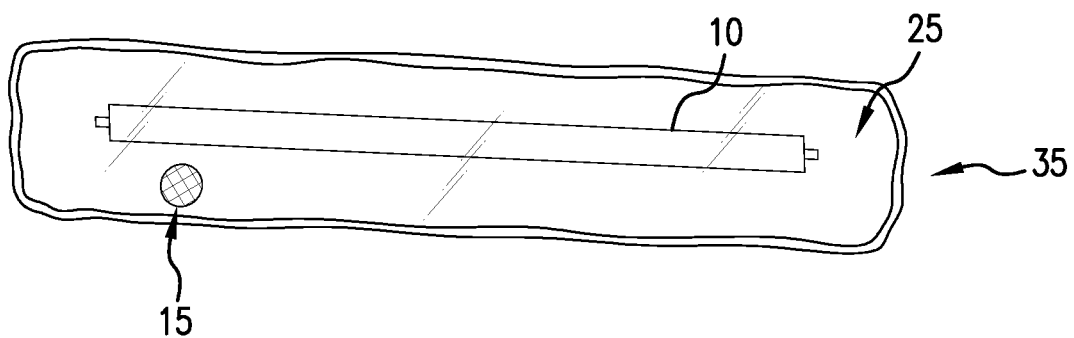
FIG. 5B shows a package containing a hermetic storage environment, a column, and a humidifying agent.

One embodiment compared the increase in binding capacity of silica-based columns, obtained from three different manufacturers, by adding synthetic humidifier BOVEDA 72% to the column storage environment. As shown in FIG. 4, silica based-columns from Qiagen DNeasy® Blood & Tissue Kit, Sigma GenElute™ Mammalian Genomic DNA Miniprep Kit, and Invitrogen™ PureLink™ Genomic DNA Mini Kit were stored for about one year at conditions specified by the manufacturer (room temperature) in original manufacturer's packaging. Afterwards, columns were placed into hermetic bags without or with the synthetic humidifier BOVEDA 72% and stored for three weeks at room temperature. Genomic DNA from 5×10$^6$ HeLa cells was purified following recommended protocols. Yields of purified genomic DNA shown in FIG. 4 were quantified spectrophotometrically.

The same results were obtained for all humidifiers (Cigar Mechanic, STOCKOSORB®, and HUMIDIPAK® BOVEDA 72%). Synthetic HUMIDIPAK® moisturizer is sold in convenient packaging, in a 2-way permeable membrane, and for this reason HUMIDIPAK® humidifier was used in a majority of experiments. HUMIDIPAK 2-way humidity control technology and its use for stabilization/prolonged shelf life of many food products, pharmaceuticals, etc., are disclosed in, e.g., U.S. Pat. Nos. 5,936,178; 6,244,432; 6,921,026; and U.S. Published Application Nos. 2004/0224144 and 2008/0314772, each of which is expressly incorporated by reference herein in its entirety.

Any type of glass fiber spin column can be used in combination with the inventive method to reduce column aging. Synthetic humidifiers evaluated as disclosed are commercially available under trademarks STOCKOSORB®, Cigar Mechanic, HUMIDIPAK®, however, any other synthetic humidifier of similar characteristics may be used to solve the column aging problem as the disclosed method teaches.

STOCKOSORB®, which contains a crosslinked acrylamide/acrylic acid copolymer and potassium salt, is a soil conditioner that increases the utilizable water holding capacity of soils and potting mixes. In the inventive method, STOCKOSORB® was swelled in water according to manufacturer's recommendations and then added to hermetic bags containing the silica-based columns in the proportion of 9 g (wet mass) per 50 columns.

Cigar Mechanic products are known to regulate humidity in both directions: to release humidity when environment humidity is below a certain level, and to absorb moisture when environmental humidity exceeds a certain threshold. The inventive method employed one bag of Cigar Mechanic per 50 silica-based columns in hermetic bags.

HUMIDIPAK® is designed to maintain a constant, predetermined level of relative humidity inside packages and containers. The inventive method used HUMIDIPAK® BOVEDA 72%, one bag per 50 silica-based columns in hermetic bags.

The following examples are intended to illustrate the utility of the present invention but do not limit the claim scope.

DNA Purification Protocol a Lambda DNA Purification Using Thermo Scientific GeneJET™ Genomic DNA Purification Kit Thirty μg (100 μl) lambda DNA (Thermo Scientific) was mixed with 100 μl PBS. Two hundred μl Lysis Solution was added and mixed thoroughly by vortexing to obtain a uniform suspension. 400 μl of 50% ethanol was added and mixed by pipetting or vortexing. The prepared lysate was transferred to GeneJET™ Genomic DNA Purification Column inserted into a collection tube. The column was centrifuged for one minute at 8000×g. The collection tube containing flow-through solution was discarded. GeneJET™ Genomic DNA Purification Column was placed into a new 2 ml collection tube. 500 μl Wash Buffer I (with ethanol) was added and centrifuged for one minute at 8000×g. The flow-through solution was discarded and the purification column was placed back into the collection tube. Five hundred μl Wash Buffer II (with ethanol) was added to the GeneJET™ Genomic DNA Purification Column and centrifuged for three minutes at maximum speed (≥12000×g). The collection tube containing flow-through solution was discarded and GeneJET™ Genomic DNA Purification Column was transferred to a sterile 1.5 ml microcentrifuge tube. Two hundred μl Elution Buffer was added to the center of the GeneJET™ Genomic DNA Purification Column membrane and incubated for two minutes at room temperature, then centrifuged for one minute at 8000×g. The elution step with an additional 200 μl Elution Buffer was repeated to increase the overall lambda DNA yield. The quantity of purified lambda DNA was measured with Thermo Scientific NanoDrop 2000 Spectrophotometer.

DNA Purification Protocol B pUCGK2 DNA Purification Using Thermo Scientific GeneJET™ Plasmid Midiprep Kit 0.8 ml Lysis Solution was added to 0.8 ml Resuspension Solution. 0.8 ml Neutralization Solution was later added and mixed immediately by inverting the tube 5-8 times. The sample was incubated for five minutes at room temperature and centrifuged for 20 minutes at 20,000 rpm (48,000×g) to collect pellet debris. The supernatant was then transferred to a 15 ml tube by decanting or pipetting to avoid disturbance or transfer of the white precipitate. Two hundred μg plasmid pUCGK2 DNA was mixed with supernatant, equal to the mix volume, and 96% ethanol was added and mixed immediately by vigorously inverting the tube 5-6 times. The vacuum manifold was prepared according to the supplier's instructions. GeneJET™ Midi Purification Column was placed onto the manifold. The sample (about 5.2 ml) was transferred to the column, vacuum was applied to draw the solution through the column, and the vacuum was switched off after the solution passed through the column. Four ml Wash Solution I (diluted with isopropanol) was added to the purification column, vacuum was applied to draw the solution through the column, and vacuum was switched off after the solution passed through. Four ml Wash Solution II (diluted with ethanol) was added to the purification column, vacuum was applied to draw the solution through the column, and vacuum was switched off after the solution had passed through. Column wash was repeated with Wash Solution II. The column was transferred into a fresh 15 ml collection tube and dried by centrifuging for five minutes at 3,000×g in a swinging bucket rotor. The column was then transferred into a fresh 15 ml collection tube. 0.4 ml Elution Buffer was added to the center of the purification column membrane, incubated for two minutes at room temperature, and centrifuged for five minutes at 3,000×g in a swinging bucket rotor to elute plasmid DNA. The elution step was repeated for a second time with 0.2 ml Elution Buffer to increase the overall pUCGK2 DNA yield. The purification column was discarded. The yield of purified plasmid DNA was measured with Thermo Scientific NanoDrop 2000 Spectrophotometer.

EXAMPLE 1

Figure 1:
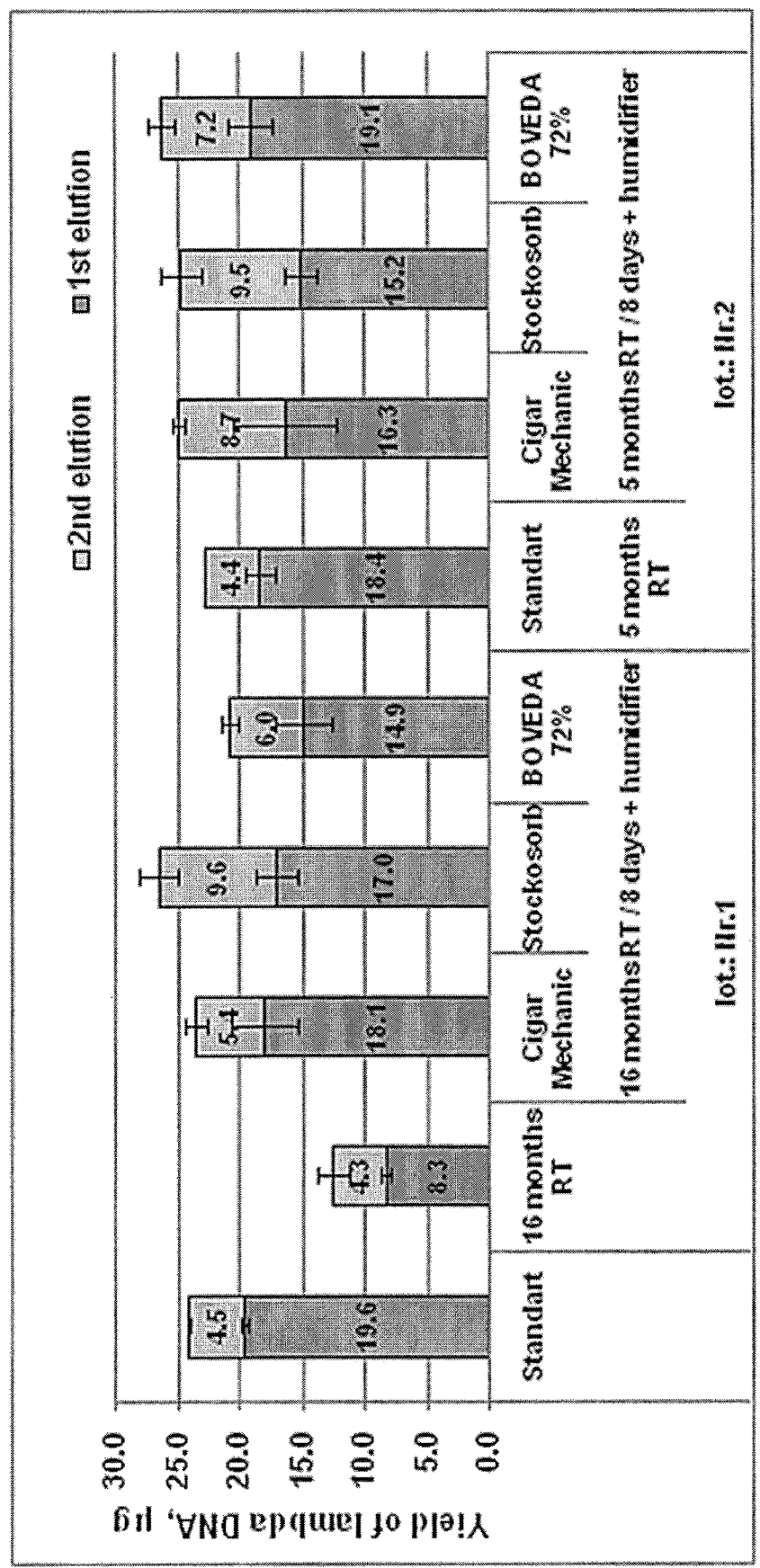
FIG. 1 shows restoration of binding capacity of silica based columns by adding synthetic humidifiers from different suppliers to the columns storage environment.

Regeneration of Silica-Based Column Binding Capacity by Adding Synthetic Humidifier from Different Suppliers to the Columns Storage Environment The process of glass fiber filter aging or decrease in column binding capacity was evaluated by comparing obtained purified DNA yields using purified lambda DNA as a standard to ensure uniformity of the starting material and the purification process. Thirty μg pure lambda DNA was purified according to protocol A, using GeneJET™ Genomic DNA Purification Kit (Thermo Scientific) with naturally dried silica mini columns stored for the indicated time in the environment with relative humidity of 20-25%. Two different manufacturing lots of silica columns stored for either 16 months (Lot No. 1), or for 5 months (Lot No. 2) were used. The results in FIG. 1 show decreasing yield of DNA purified with columns from Lot. No. 1 after storage for 16 months at room temperature, and increase in lambda DNA yields up to the level of standard "freshly manufactured" lots when the same columns were placed into hermetic bags with three different humidifiers: Cigar Mechanic, STOCKOSORB®, and HUMIDIPAK® (BOVEDA 72%) and stored for 8 days. Columns of Lot No. 2 stored at room temperature for only 5 months did not show significant loss in binding capacity, so the addition of humidifiers had little influence to their binding capacity.

EXAMPLE 2

Restoration and Maintenance of Binding Capacity of Mini Silica-Based Columns by Adding a Synthetic Humidifier BOVEDA 72% in the Storage Environment Silica columns from GeneJET™ Genomic DNA Purification Kit (Thermo Scientific) lost part of their binding capacity after prolonged storage for 16 months, as shown in Example 1. Aiming to simulate long storage periods, accelerated column drying process was used, namely, column incubation at higher temperature, e.g., 37° C. After one week incubation at 37° C., column performance reliably decreased, afterwards the columns were further stored at room temperature. The restoration of dried columns was achieved by adding BOVEDA 72%, followed by column storage for at least one week at room temperature until relative humidity in the hermetic bag was equilibrated up to about 53-56%. Relative humidity in the bag with dried columns was about 20-23%. Thirty μg of pure lambda DNA was purified according to protocol A. The results in FIG. 2 show that columns kept in hermetic bags with synthetic humidifier BOVEDA 72% recovered their binding capacity after one week and maintained their binding capacity for as long as examined, e.g., up to ten weeks. Artificially dried columns placed into hermetic bags without humidifier did not restore their binding capacity. Yields of purified lambda DNA using columns stored in humid environment were two times higher in comparison with dried columns (see FIG. 2).

EXAMPLE 3

Restoration of Dried Silica Columns Performance with Humidifier BOVEDA 72% Compared to Column Pre-Wetting with Water Directly Before Purification Silica columns from GeneJET™ Plasmid Midiprep Kit (Thermo Scientific) were artificially desiccated at 37° C. or 50° C. for 2.5 months. After drying, columns were placed into hermetic bags with or without synthetic humidifier BOVEDA 72% and stored for six weeks at RT. Two hundred μg plasmid DNA pUCGK2 was purified using GeneJET™ Plasmid Midiprep Kit. For evaluation of plasmid DNA yield obtained from water pre-wetted dried columns, 1000 μl water was added to the columns stored without humidifier and incubated for five min at room temperature directly before use in purification. As shown in FIG. 3, columns dried at 37° C. lost binding capacity, about 1.5 times decrease, and were fully restored after storage with BOVEDA 72%. Columns dried at 50° C. lost their binding capacity more than 12 times. After storage with BOVEDA 72%, they regained their binding capacity of about 9 times, but not up to the initial level. Yields of pUCGK2 purified using columns desiccated at 37° C. or 50° C. and directly pre-wetted before the purification were lower than those obtained when BOVEDA 72% was used (see FIG. 3).

EXAMPLE 4

Increase of Silica-Based Columns' Binding Capacity Obtained from Three Different Manufacturers by Adding Synthetic Humidifier BOVEDA 72% to the Storage Environment Example 4 shows that the inventive method is applicable for use with silica columns available from different suppliers. Silica based columns from Qiagen DNeasy® Blood & Tissue Kit, Sigma GenElute™ Mammalian Genomic DNA Miniprep Kit, and Invitrogen™ PureLink™ Genomic DNA Mini Kit were stored for approximately one year at conditions specified by the manufacturer (room temperature) and in the manufacturer's package. After this storage time, columns were placed into hermetic bags without or with synthetic humidifier BOVEDA 72% and stored for 3 weeks at room temperature. Genomic DNA from $5 \times 10^6$ HeLa cells was purified according to manufacturer's recommended protocol. In all three conditions, higher DNA yields were obtained when BOVEDA 72% was used (see FIG. 4).

The following references are incorporated by reference herein in their entirety:
Boom, R., Sol, C. J., Salimans, M. M., Jansen, C. L., Wertheim-van Dillen, P. M., van der Noordaa, J. (1990) Rapid and simple method for purification of nucleic acids. J Clin Microbiol. 28(3): 495-503.
Herzer, S. (2002) DNA Purification, in Molecular Biology Problem Solver: A Laboratory Guide (Ed A. S. Gerstein), John Wiley & Sons, Inc., New York USA. doi: 10.1002/ 0471223905. Chapter 7
Xu, L., Lv, J., Ling, L., Wang, P., Song, P., Su, R., Zhu, G. (2011) Altered nucleic acid partitioning during phenol extraction or silica adsorption by guanidinium and potassium salts. Anal Biochem. 419(2): 309-16.

The embodiments shown and described in the specification are only specific embodiments of inventors who are skilled in the art and are not limiting in any way. Therefore, various changes, modifications, or alterations to those embodiments may be made without departing from the spirit of the invention in the scope of the following claims.

What is claimed is:
1. A method to prevent or reduce aging of a silica-based column comprising:
    storing a silica-based column in a hermetic storage environment, the hermetic storage environment containing at least one humidifying agent, thereby reducing aging of the silica-based column in comparison to a silica-based column stored in the hermetic storage environment in the absence of the humidifying agent.
2. The method of claim 1, further resulting in enhanced nucleic acid binding capacity of the silica-based column.
3. The method of claim 1, wherein the humidifying agent is at least one of a crosslinked polyacrylic acid-potassium salt, a crosslinked acrylamide/acrylic acid copolymer and potassium salt, Cigar Mechanic, or a composition compris- ing water, sodium chloride, potassium chloride, xanathan gum, and/or propylene glycol alginate and/or gellan.

4. The method of claim 3, wherein the composition comprising water, sodium chloride, potassium chloride, xanathan gum, and/or propylene glycol alginate and/or gellan humidifying agent is a salt solution that absorbs or releases moisture for use in controlling humidity in closed environments.

5. The method of claim 1, wherein the hermetic storage environment is a plastic bag.

6. The method of claim 1, wherein the silica-based column is a gravity-flow column, a vacuum-assisted flow column, or a spin column.

7. The method of claim 1, wherein the humidifying agent results in a relative humidity in the range of 40% to 70% in the hermetic storage environment.

8. A method to comprising:
 storing a silica-based column in a hermetic storage environment containing at least one humidifying agent, thereby enhancing nucleic acid binding capacity of the silica-based column in comparison to a silica-based column stored in the hermetic storage environment in the absence of the humidifying agent.

9. A kit comprising:
 at least one humidifying agent, wherein the humidifying agent is at least one of a crosslinked polyacrylic acid-potassium salt, a cross-linked acrylamide/polyacrylic acid copolymer, and a potassium salt, or a composition comprising water, sodium chloride, potassium chloride, xanthum gum, and/or propylene glycol alginate and/or gellan;
 a silica-based column;
 a container for providing a hermetic storage environment for the silica based column; and
 instructions for storing the silica-based column using the kit.

10. A composition comprising:
 a package; and
 a hermetic storage environment, the hermetic storage environment containing:
  (i) at least one humidifying agent, and
  (ii) a silica-based column.

11. The composition of claim 10, wherein the humidifying agent is incorporated within the hermetic storage environment.

12. The composition of claim 10, wherein the silica-based column is at least one of a gravity-flow column, a vacuum-assisted flow column, or a spin column.

13. The composition of claim 10, wherein the humidifying agent is at least one of a crosslinked polyacrylic acid-potassium salt, crosslinked acrylamide/acrylic acid copolymer and potassium salt; Cigar Mechanic; or a composition comprising water, sodium chloride, potassium chloride, xanathan gum, and/or propylene glycol alginate and/or gellan.

14. The composition of claim 10, wherein the hermetic storage environment is a plastic bag.

15. The composition of claim 10, wherein the hermetic storage environment has a relative humidity in the range of 40% to 70%.

16. A composition of claim 10, wherein the hermetic storage environment is substantially impervious to air and/or water and/or water vapor.

* * * * *

UNITED STATES PATENT AND TRADEMARK OFFICE
CERTIFICATE OF CORRECTION

PATENT NO. : 10,829,291 B2
APPLICATION NO. : 13/906243
DATED : November 10, 2020
INVENTOR(S) : Jolanta Vitkute Page 1 of 1

It is certified that error appears in the above-identified patent and that said Letters Patent is hereby corrected as shown below:

On the Title Page

The Assignee should read as "Thermo Fisher Scientific Baltics UAB"

In the Claims

Column 8, Claim 3, Line 67:
"Cigar Mechanic" should read as "cigar mechanic"

Column 9, Claim 8, Line 17:
Please remove "to"

Column 9, Claim 9, Line 30:
"xanthum" should read as "xanathum"

Column 10, Claim 13, Line 20:
"Cigar Mechanic" should read as "cigar mechanic"

Column 10, Claim 16, Line 29:
Please remove "A" and insert --The--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*